(12) United States Patent
Mitra et al.

(10) Patent No.: US 7,020,080 B1
(45) Date of Patent: Mar. 28, 2006

(54) METHOD AND APPARATUS FOR PREVENTION OF FLOW STARVATION WITH WEIGHTED FAIR QUEUING

(75) Inventors: Somnath Mitra, San Leandro, CA (US); Pui Li, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 908 days.

(21) Appl. No.: 09/974,963

(22) Filed: Oct. 9, 2001

(51) Int. Cl.
*H04L 12/56* (2006.01)

(52) U.S. Cl. ...................................... 370/229; 370/418

(58) Field of Classification Search ............... 370/229, 370/429, 418, 428, 468
See application file for complete search history.

(56) References Cited

U.S. PATENT DOCUMENTS

| | | | | |
|---|---|---|---|---|
| 5,732,087 A | * | 3/1998 | Lauer et al. ................. | 370/416 |
| 6,061,330 A | * | 5/2000 | Johansson ..................... | 370/229 |
| 6,092,115 A | * | 7/2000 | Choudhury et al. ........ | 709/235 |
| 6,101,193 A | * | 8/2000 | Ohba .......................... | 370/429 |
| 6,134,217 A | * | 10/2000 | Stiliadis et al. ............. | 370/232 |
| 2002/0176358 A1 | * | 11/2002 | Assa et al. ................... | 370/229 |
| 2004/0213257 A1 | * | 10/2004 | Abdelilah et al. ........ | 370/395.1 |

* cited by examiner

*Primary Examiner*—Wellington Chin
*Assistant Examiner*—F. Lin Khoo
(74) *Attorney, Agent, or Firm*—Sierra Patent Group, Ltd.

(57) ABSTRACT

Method and apparatus for queuing packets are disclosed. In one aspect, a method may comprise assigning each packet a first value; dynamically assigning each packet a second value; and queuing each packet for transmission using the first and second values.

12 Claims, 7 Drawing Sheets

METHOD AND APPARATUS FOR PREVENTION OF FLOW STARVATION WITH WEIGHTED FAIR QUEUING

BACKGROUND

1. Field of the Disclosure

The disclosure relates generally to data communications, and in particular, to an improved method and apparatus for preventing flow starvation with Weighted Fair Queuing.

2. The Prior Art

Background

Control of packet flow in routers is one important task in the management of networks.

Figure 1:
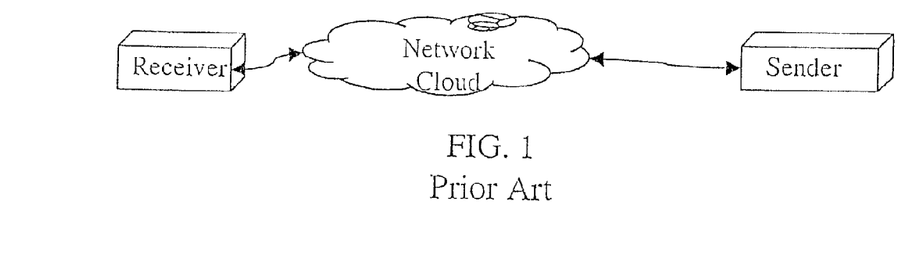
FIG. 1 is a prior art diagram of a communications system.

FIG. 1 shows an example of a prior art communication system. FIG. 1 shows a sender and a receiver connected to a network cloud. For purposes of this disclosure, the sender and receiver may be any standard electronic devices which desire to communicate through an electronic network such as the Internet, a Local Area Network (LAN), or a Wide Area Network (WAN).

To the end user, the operation of the system in FIG. 1 should be transparent and error free. For example, an end user (receiver) watching streaming video originating from a video server (sender) should never know what is taking place within the network cloud that makes the process possible.

Figure 2:
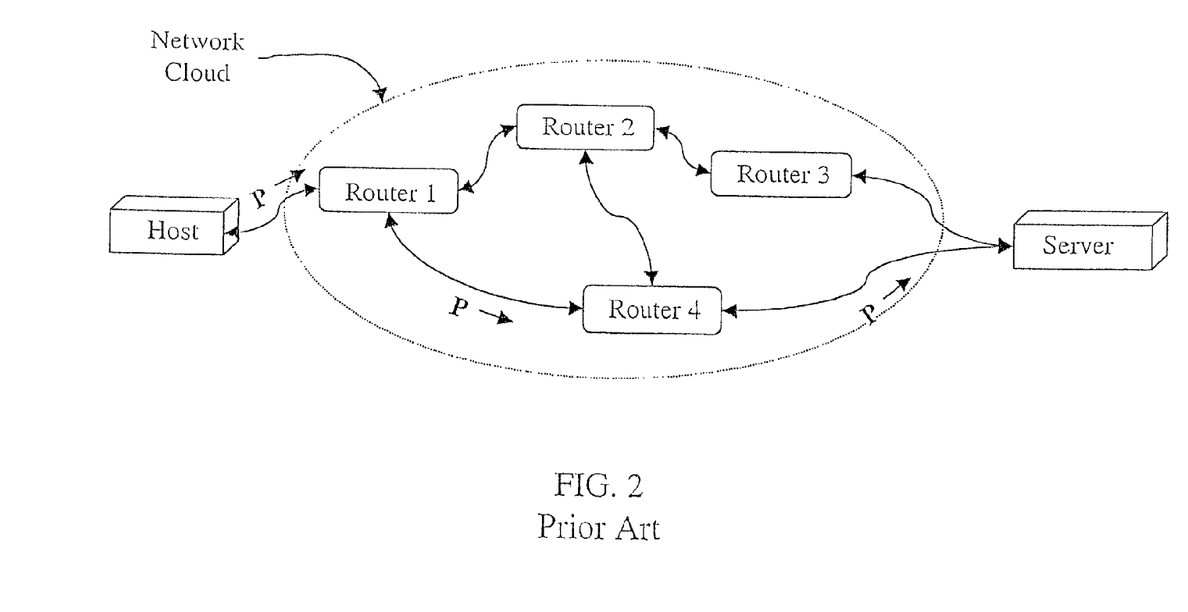
FIG. 2 is another prior art diagram of a communications system.

FIG. 2 is a more detailed diagram of a prior art communications system. FIG. 2 expands on the detail of FIG. 1 by showing an example of communications occurring over a standard Internet connection. FIG. 2 includes a host and a server connected to a network cloud comprising a plurality of routers. In FIG. 2, the host wishes to transmit a packet P to the server. As is known by those of ordinary skill in the art, when the packet P arrives at router 1, the router 1 will encode the packet P with a unique identifier containing the source and destination addresses. Then router 1 will forward the packet P onto the destination through other routers according to standard routing protocols. In this example, router 1 will forward packet P onto router 4, which will then forward the packet P onto the ultimate destination, which in our example here is the server.

Figure 3:
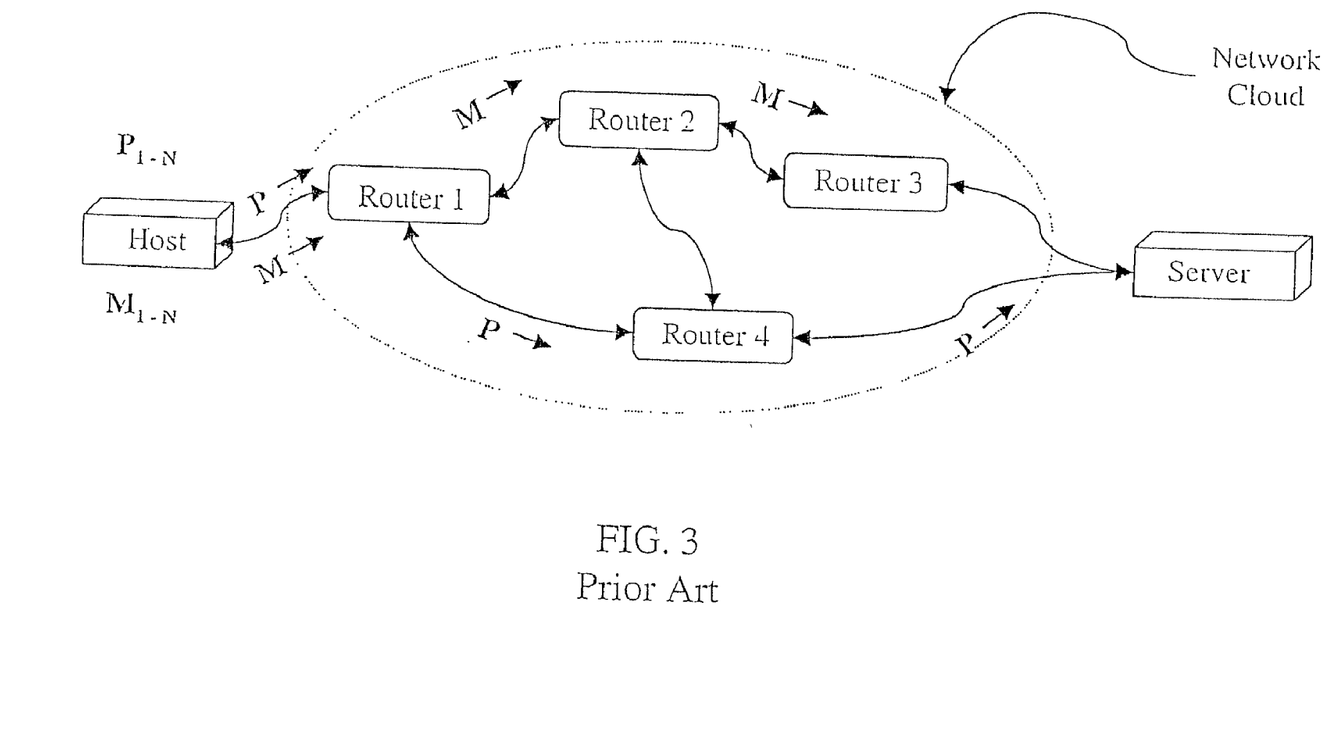
FIG. 3 is a prior art diagram of a communications system containing a router and firewall application illustrating packets competing to be transmitted.

Increasing bandwidth demands can cause performance degradations in packet-based systems. FIG. 3 is a diagram of a prior art system with two packet streams P and M each including packets 1–N competing for bandwidth. To fairly allocate limited bandwidth between competing packet flows, a prior art process known as Weighted Fair Queuing may be employed.

As is known by those of ordinary skill in the art, Weighted Fair Queuing is process whereby priority may be given to some flows in favor of others by assigning an ID to the packets of the flows prior to the packets being queued at the egress point of the router. The ID is computed from characteristics that uniquely identify a particular packet flow and provides multiple levels of flow priority while ensuring that the order of egress and ingress of the flows is maintained.

In a typical scenario, packets to be sent are sorted on a flow basis with several flows competing for egress based on the ID of the packet at the head of the flow. For efficient sorting, IDs are assigned in a monotonically increasing manner, with packets having smaller ID numbers queued first. A packet ID S may be assigned using an algorithm such as:

$$S = (W + (T*D) >> \text{scale}) \qquad \text{Eq. 1}$$

Where: S=ID or sequence number;

W=Wallclock, such as a local clock, or the ID of the last packet transmitted;

T=Type of Service Factor; and

D=Datagram size in bytes.

In Eq. 1, "scale" is a divisor to bring the (T*D) factor into a reasonable number such that it does not make "S" wrap around too quickly. As is appreciated by those of ordinary skill in the art, the ">>" is taken from the C or Java programming languages, and means "shift right by so many bits". In essence, it is division by ($2^{scale}$). The >>scale operator will be so used and defined throughout this disclosure.

However, the ID has a finite word length, resulting in an absolute maximum ID value. Thus, when the number of queued packets exceeds the absolute limit, the ID numbers will be forced to 'wrap' around and repeat, resulting in flows having both high-number packets and low-numbered packets. This will confuse the sorting logic, as the low-numbered packets will be treated as having a high priority while the high-numbered packets will be treated as having a low priority, resulting in some packets which properly should be given a later queue time being placed at the head of the queue.

Under high demands, some flows may be starved of service for a brief period, as the ID numbers cycle wrap around. In a worst-case scenario, some flows may be starved of service completely. As will be appreciated by those skilled in the art, high end or faster routers will experience these problems sooner than low end or slower routers because of the faster rates of packet de-queuing.

Figure 4A:
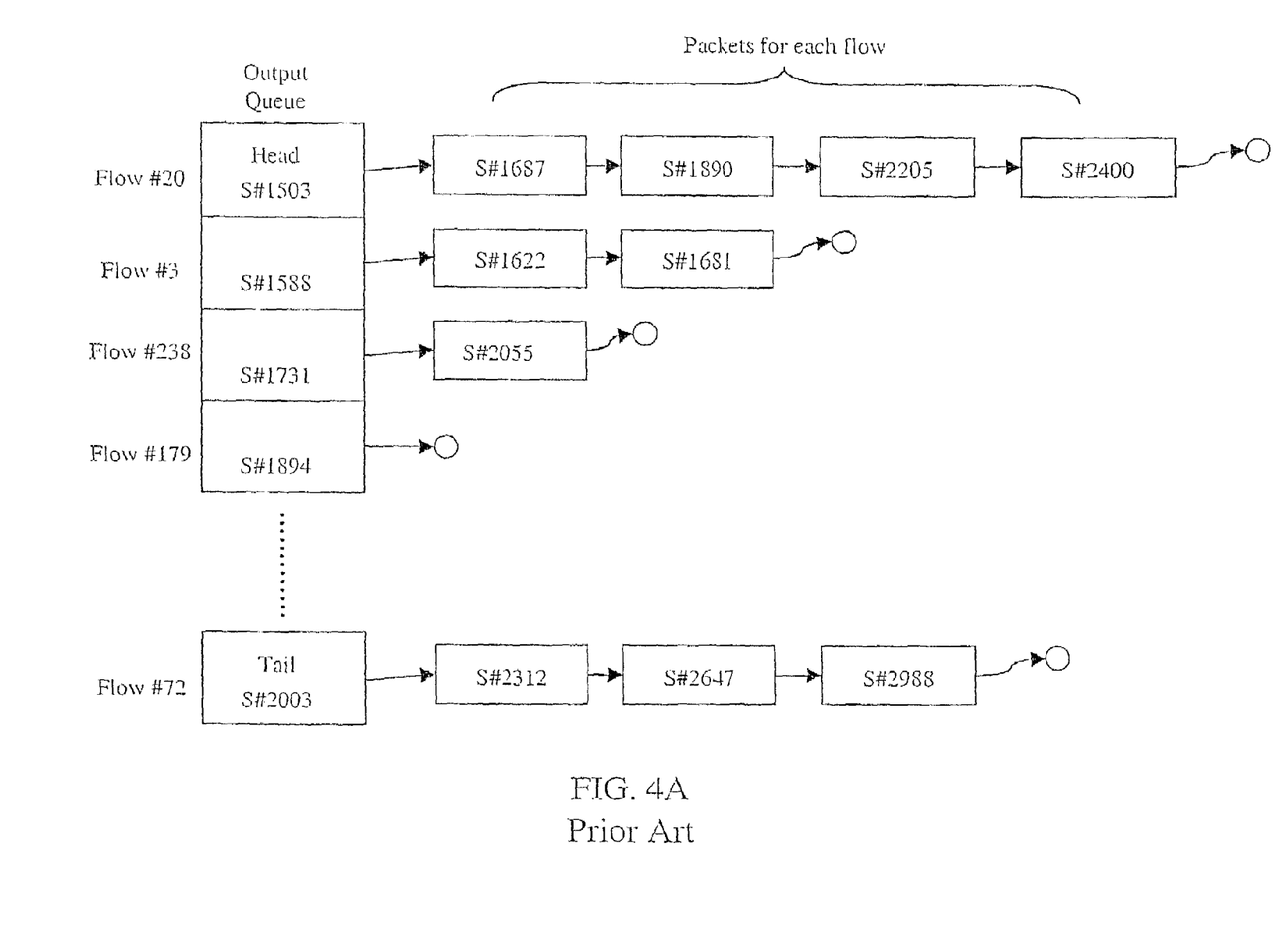
FIGS. 4A–4D are prior art diagrams illustrating weighted fair queuing.

FIGS. 4A–4D are diagrams illustrating weighted fair queuing according to the prior art. The illustration begins in FIG. 4A, which shows a series of flows in a queue waiting to be transmitted. The next packet to be transmitted in FIG. 4A is S#1503 from Flow#20 which is at the head of the queue.

Figure 4B:
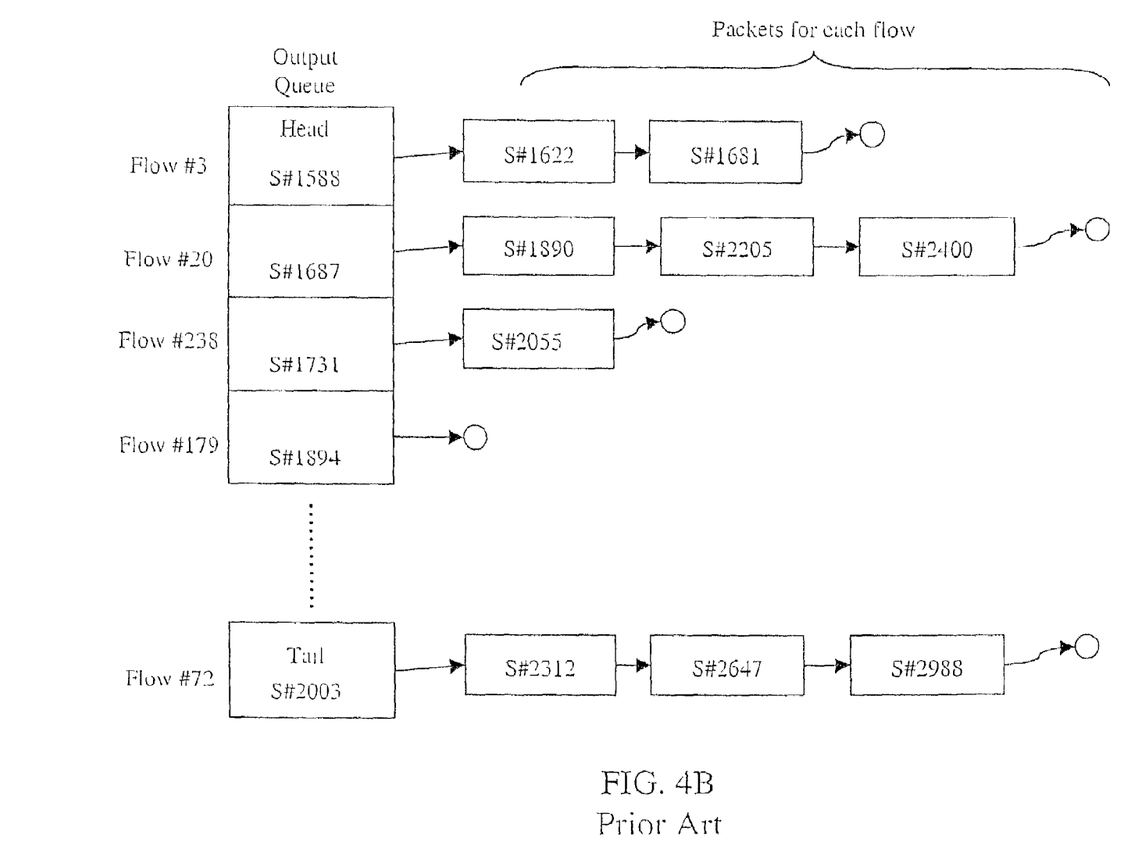

Continuing in FIG. 4B, packet with S#1503 has now been transmitted. However, the flows have now been re-sorted, and hence Flow#3 now has a packet S#1588 at the head of the queue. Note that flow #72 has a packet S#2988. In this example, we will assume that 3000 is the highest number that may be assigned. Thus, in the scenario of FIGS. 4A–4D, the ID numbers are close to wrapping around.

Figure 4C:
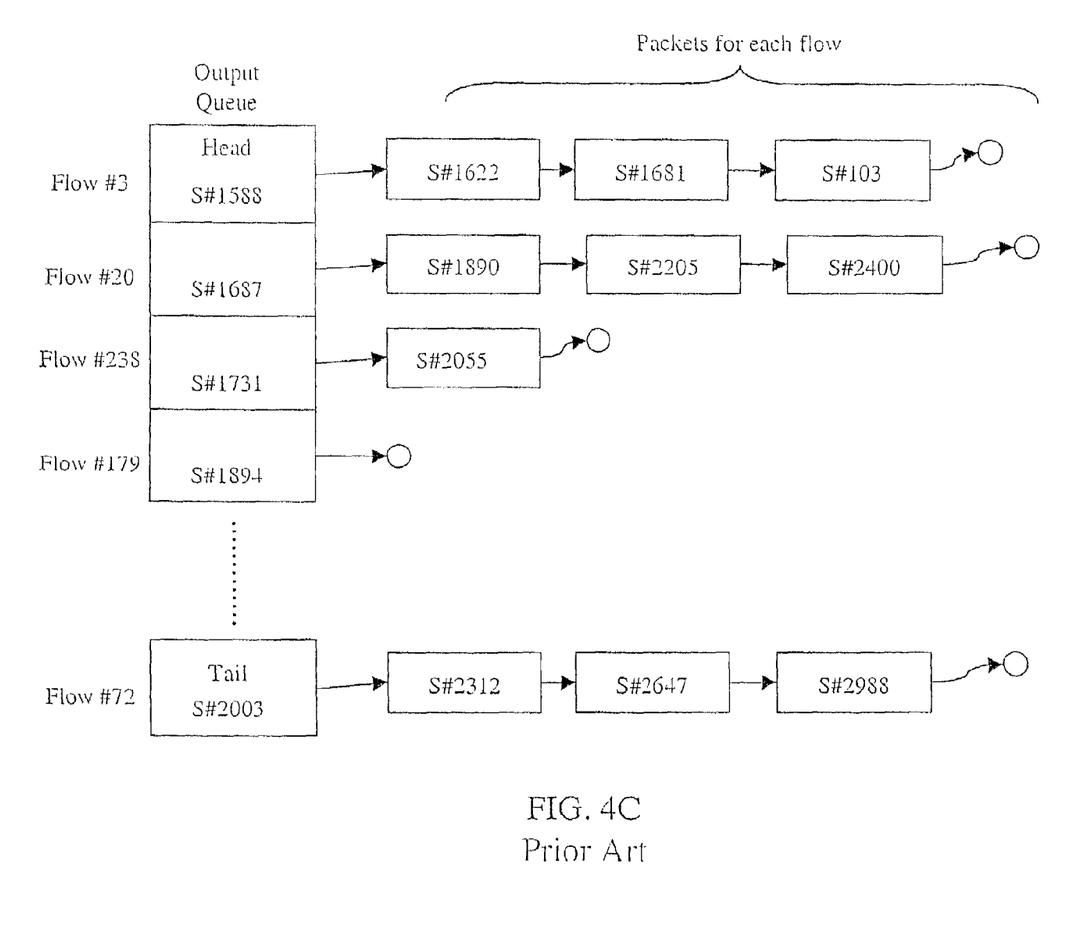

In FIG. 4C, packet S#1588 of Flow#3 has not yet been transmitted. However, a new packet for Flow#3 has arrived after the sequence numbers have wrapped around 3000, and has been assigned a sequence number of S#103.

Figure 4D:
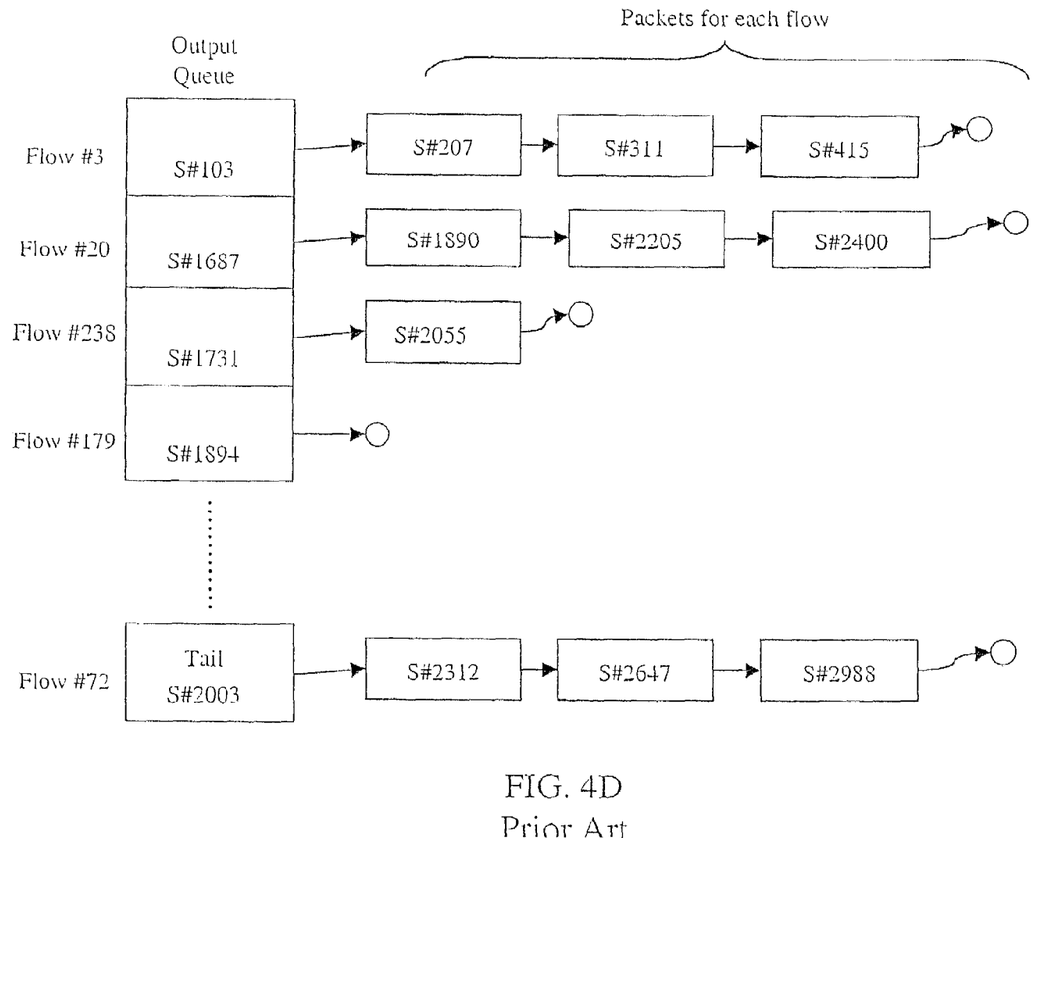

Finally, in FIG. 4D, packets with S#1588, 1622 and 1681 have now been transmitted. Simultaneously, multiple packets for Flow#3 have arrived. Because of the wrap around of the sequence number, the packets of Flow #3 are all assigned low sequence numbers.

Thus, Flows #20, #238, etc. with packets having higher sequence numbers, although they arrived much earlier and should have been scheduled for earlier transmission, will be starved of service for a period of time. If sequence numbers did not wrap around at 3000, the packets of Flow#3 would have numbers 3103, 3207, 3311 and 3415. Thus, they would properly be queued later than the earlier the arriving packets.

SUMMARY

Method and apparatus for queuing packets are disclosed. In one aspect, a method may comprise assigning each packet a first value; dynamically assigning each packet a second value; and queuing each packet for transmission using the first and second values.

A sequence number may be assigned to each packet and may have a value of:

$$S=(W+(T*D)>>\text{scale})\%N.$$

A Real Sequence number may also be dynamically assigned for each packet having a value of:

if (S<W), then RS=(S+N);
else RS=S.

RS may be used for packet comparison in the queue.

DETAILED DESCRIPTION

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be accessed using machines know in the art. Such machines may contain processors and associated circuitry standard in the art, such as network interfaces, internal busses, and the like.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

This disclosure presents a algorithm for computing packet IDs which preferably prevents flow starvation. In the present disclosure, each packet may be assigned to values that are used for queuing purposes. Algorithms for generating the first and second values will now be disclosed.

In an exemplary embodiment, an algorithm for generating a packet sequence number S may be defined as:

$$S=(W+(T*D)>>\text{scale})\%N \qquad \text{Eq. 2}$$

Where: S=ID or sequence number;
W=Wallclock, such as a local clock, or the ID of the last packet transmitted;
T=Type of Service Factor;
D=Datagram size in bytes; and
N=the range of IDs or sequence numbers [0 . . . N–1].

In Eq. 2, the "%" indicates the modulo operator as defined in the C or Java languages, resulting in the remainder.

The value of N is preferably chosen such that multiple wraps around W are avoided. In an exemplary embodiment, N is chosen such that (2*N–1) fits into the word length.

Additionally, N may be chosen such that Eq. 2 achieves a desired result. Eq. 2 may be expressed as:

$$S = \frac{(W + X)}{N} \qquad \text{Eq. 3}$$

N is preferably large enough to prevent wrap-arounds. In an exemplary embodiment, N is chosen such that Eq. 3 is less than W. In other words, N may be chosen such that X is not greater than N.

Additionally, this disclosure introduces a Real Sequence Number RS for introducing new elements into a sorted list. In an exemplary embodiment, RS may be defined as:

if (S<W), then RS=(S+N);
else RS=S.

It is contemplated that RS may be used for packet comparison in the queue.

Thus, in queuing in accordance with the teachings of this disclosure, each packet may have an ID (S) and a real sequence number (RS). Furthermore, both S and RS may be used for comparison purposes in the queue.

However, RS may be a dynamically computed entity. This means for example, that for the same packet, RS may be (S+N) for a while and then, after some more packets have been transmitted, RS=S. The value of RS may be dynamically assigned because the Wall Clock (W) changes with passage of time.

By using RS for comparison purposes, the wrap-around problems of the prior art may be avoided. It will be further appreciated by those skilled in the art that the algorithms of this disclosure achieve the desired results independent of the source of W, or how the prior art methods compute S.

Figure 5:
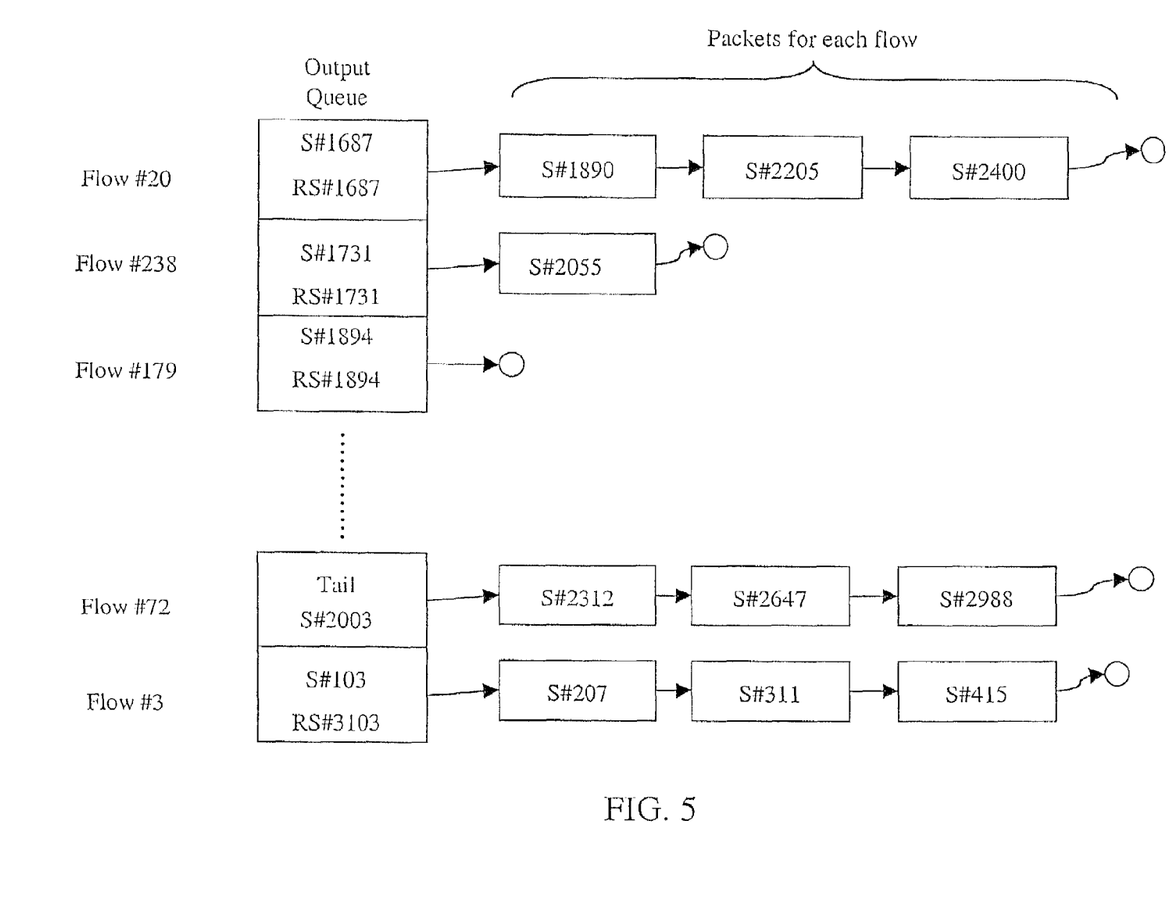
FIG. 5 is a diagram illustrating weighted fair queuing in accordance with the teachings of this disclosure.

FIG. 5 is an illustration of weighted fair queuing in accordance with the teachings of this disclosure. In the example of FIG. 5, the packets are as illustrated in the prior art diagram of FIG. 4D. Additionally, the wall clock is at 1681, that is the sequence number of last packet of Flow#3 transmitted after FIG. 4C. Additionally, each packet has an RS value dynamically associated with it computed as disclosed above.

Using the value of RS to order and place flows in the output queue, we find that Flow#3 is ordered and placed at the bottom of the queue. Thus, the earlier arriving packets of Flow #20 will be transmitted first. Therefore, with the weighted fair queuing of this disclosure, the egress order is preserved despite the sequence number S# wrapping around.

It is contemplated that the teachings of this disclosure may be embodied in any machine that may be responsible for transmitting packets. For example, routers may advantageously embody the teachings of this disclosure. Such routers may contain hardware and software known in the art, such as processors, memory, and associated circuitry. For example, the router may include a central processor such as a Motorola 860 Power PC. Additionally, the router may be coupled to a LAN, such as an Ethernet-based network, and a WAN, such as a T1 line. The router may also be coupled to a network through either a LAN or WAN.

Additionally, the teachings of this disclosure may be embodied in any standard electronic devices which desire to communicate through an electronic network such as the Internet, a Local Area Network (LAN), or a Wide Area Network (WAN), and may be configured to communicate over such networks using packet- or frame-based protocols known in the art. Such devices may include processors and associated memory and circuitry for the storage and retrieval of data and instructions.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. A method for queuing packets for transmission comprising:
    assigning each packet a first value;
    dynamically assigning each said packet a second value; and
    queuing each said packet for transmission using said first and second value,
    wherein said first value comprises a sequence number S having a value of $S=(W+(T*D)>>scale)\% N$, wherein W is the sequence number of the last packet transmitted, T is a service factor, D is the size of each said packet, scale is a divisor for (T*D) factor such that S does not wrap around too quickly, and N is the range of sequence numbers.

2. The method of claim 1, wherein said second value comprises a real sequence number RS having a value of:
    if (S<W), then RS=(S+N);
    else RS=S.

3. The method of claim 2, wherein RS is dynamically computed.

4. An apparatus for queuing packets for transmission comprising:
    means for assigning each packet a first value;
    means for dynamically assigning each said packet a second value; and
    means for queuing each said packet for transmission using said first and said second value,
    wherein said first value comprises a sequence number S having a value of $S=(W+(T*D)>>scale)\% N$, wherein W is the sequence number of the last packet transmitted, T is a service factor, D is the size of each said packet, scale is a divisor for (T*D) factor such that S does not wrap around too quickly, and N is the range of sequence numbers.

5. The apparatus of claim 4, wherein said second value comprises a real sequence number RS having a value of:
    if (S<W), then RS=(S+N);
    else RS=S.

6. The apparatus of claim 5, further including means for dynamically computing RS.

7. A program storage device readable by a machine, tangibly embodying a program of instructions executable by the machine to perform a method for queuing packets for transmission comprising:
    assigning each packet a first value;
    dynamically assigning each said packet a second value; and
    queuing each said packet for transmission using said first and second value,
    wherein said first value comprises a sequence number S having a value of $S=(W+(T*D)>>scale)\% N$, wherein W is the sequence number of the last packet transmitted, T is a service factor, D is the size of each said packet, scale is a divisor for (T*D) factor such that S does not wrap around too quickly, and N is the range of sequence numbers.

8. The program storage device of claim 7, wherein said second value comprises a real sequence number RS having a value of:
    if (S<W), then RS=(S+N);
    else RS=S.

9. The program storage device of claim 8, wherein RS is dynamically computed.

10. A router comprising:
    a processor configured to assign each packet a first value;
    dynamically assign each said packet a second value; and
    queu each said packet for transmission using said first and second value,
    wherein said first value comprises a sequence number S having a value of $S=(W+(T*D)>>scale)\% N$, wherein W is the sequence number of the last packet transmitted, T is a service factor, D is the size of each said packet, scale is a divisor for (T*D) factor such that S does not wrap around too quickly, and N is the range of sequence numbers.

11. The router of claim 10, wherein said second value comprises a real sequence number RS having a value of:
    if (S<W), then RS=(S+N);
    else RS=S.

12. The router of claim 11, wherein RS is dynamically computed.

* * * * *

UNITED STATES PATENT AND TRADEMARK OFFICE
CERTIFICATE OF CORRECTION

PATENT NO. : 7,020,080 B1
APPLICATION NO. : 09/974963
DATED : March 28, 2006
INVENTOR(S) : Mitra, Somnath It is certified that error appears in the above-identified patent and that said Letters Patent is hereby corrected as shown below:

Column 6, Line 36, replace "a processor configured to assign each packet a first value;" with --a processor configured to:_ assign each packet a first value;-,--.

Column 6, Line 37, replace "dynamically assign each packet a second value; and" with --dynamically assign each said packet a second value;-, and--.

Column 6, Line 38, replace "queu each said packet for transmission using said first and second value," with --queue each said packet for transmission using said first and second value,-;--.

Signed and Sealed this

Twenty-second Day of August, 2006

JON W. DUDAS
*Director of the United States Patent and Trademark Office*